United States Patent
Cox et al.

(10) Patent No.: US 11,635,257 B2
(45) Date of Patent: Apr. 25, 2023

(54) SMELTING APPARATUS AND METALLURGICAL PROCESSES THEREOF

(71) Applicant: NSGI STEEL INC., Montreal (CA)

(72) Inventors: Ian Cox, East Amherst, NY (US); Enrico Di Cesare, Pierrefonds (CA)

(73) Assignee: NSGI Steel Inc., Montreal (CA)

( * ) Notice: Subject to any disclaimer, the term of this patent is extended or adjusted under 35 U.S.C. 154(b) by 77 days.

(21) Appl. No.: 16/802,104

(22) Filed: Feb. 26, 2020

(65) Prior Publication Data

US 2020/0191481 A1    Jun. 18, 2020

Related U.S. Application Data

(63) Continuation-in-part of application No. 15/023,178, filed as application No. PCT/CA2014/000711 on Sep. 29, 2014, now abandoned.
(Continued)

(51) Int. Cl.

| F27B 3/20 | (2006.01) |
|---|---|
| C21B 5/00 | (2006.01) |
| F27B 3/10 | (2006.01) |
| F27B 3/18 | (2006.01) |
| F27B 3/22 | (2006.01) |
| F27B 3/24 | (2006.01) |

(52) U.S. Cl.
CPC .............. *F27B 3/205* (2013.01); *C21B 5/001* (2013.01); *F27B 3/105* (2013.01); *F27B 3/18* (2013.01); *F27B 3/22* (2013.01); *F27B 3/24* (2013.01)

(58) Field of Classification Search
CPC ....... C21B 11/08; C21B 13/00; C21B 13/004; C21B 5/001; F27B 3/105; F27B 3/18; F27B 3/205; F27B 3/22; F27B 3/24

USPC ......... 266/249, 44, 168, 197, 900, 251, 252, 266/268; 75/10.39, 10.4, 10.41, 10.62, 75/10.63, 459, 499
See application file for complete search history.

(56) References Cited

U.S. PATENT DOCUMENTS

| 4,676,486 A * | 6/1987 | Rall ................. F27D 25/00 266/900 |
|---|---|---|
| 4,798,624 A * | 1/1989 | Brotzmann ......... C21B 13/0013 75/502 |

(Continued)

FOREIGN PATENT DOCUMENTS

| CA | 2934973 | 7/2015 |
|---|---|---|
| CA | 2970818 | 6/2016 |

(Continued)

*Primary Examiner* — Scott R Kastler
*Assistant Examiner* — Michael Aboagye
(74) *Attorney, Agent, or Firm* — Benoit & Côté Inc.

(57) ABSTRACT

A smelting apparatus for smelting metallic ore comprising a furnace having a continuous curved wall and end walls defining a longitudinal volume having a longitudinal axis in a horizontal direction. The continuous curved wall has a lowermost area. The longitudinal volume is divided in at least three longitudinal layers comprising a top layer within which gasified fuel is combusted for creating a hot gas composition to release, from the metallic ore, at least molten metal and slag, a lowermost layer at the lowermost area for holding molten metal, and a mid-layer above the lowermost layer in which the slag accumulates. The present document also describes processes using the smelting apparatus for producing ferrous and non-ferrous minerals from a metallic ore.

4 Claims, 4 Drawing Sheets

Related U.S. Application Data

(60) Provisional application No. 61/883,673, filed on Sep. 27, 2013.

(56) References Cited

U.S. PATENT DOCUMENTS

| | | | | |
|---|---|---|---|---|
| 5,851,263 A | * | 12/1998 | Bernet | C21C 5/5217 |
| | | | | 75/10.41 |
| 5,961,055 A | | 10/1999 | Lehtinen | |
| 8,313,690 B2 | * | 11/2012 | Hayton | F27B 3/205 |
| | | | | 266/207 |
| 2010/0263484 A1 | * | 10/2010 | Moore | C22B 9/226 |
| | | | | 75/10.36 |
| 2016/0208350 A1 | | 7/2016 | Cox et al. | |

FOREIGN PATENT DOCUMENTS

| | | | | |
|---|---|---|---|---|
| EP | 2380995 | * | 10/2011 | C21B 5/001 |
| WO | 2018152628 A1 | | 8/2018 | |

\* cited by examiner

SMELTING APPARATUS AND METALLURGICAL PROCESSES THEREOF

CROSS-REFERENCE TO RELATED APPLICATIONS

This application claims priority of U.S. provisional patent application No. 61/883,673, filed on Sep. 27, 2013, the specification of which is hereby incorporated by reference. This application is a continuation-in-part (CIP) of U.S. patent application Ser. No. 15/023,178, filed Mar. 18, 2016.

BACKGROUND

(a) Field

The subject-matter disclosed generally relates to smelting apparatus and to smelting processes. More particularly, the subject-matter relates to smelting apparatus for iron ore and processes for smelting iron ore.

(b) Related Prior Art

Smelting is a form of extractive metallurgy. Its main use is to produce a metal from its ore. This includes production of silver, iron, copper and other base metals from their ores. Smelting uses heat and a chemical reducing agent to decompose the ore, driving off other elements as gasses or slag and leaving just the metal behind. The reducing agent is commonly a source of carbon such as coke or charcoal. The carbon and/or carbon oxide derivative react(s) with the ore to remove oxygen from the ore, leaving behind elemental metal. The carbon is thus oxidized in two stages, producing first carbon monoxide and then carbon dioxide. As most ores are impure, it is often necessary to use flux, such as limestone, to remove the accompanying rock gangue as slag.

Plants for the electrolytic reduction of aluminum are also generally referred to as smelters. These do not melt aluminum oxide but instead dissolve it in aluminum fluoride. They normally use carbon electrodes, but novel smelter designs use electrodes that are not consumed in the process. The end product is molten aluminum.

Smelting involves more than just melting the metal out of its ore. Most ores are a chemical compound of the metal with other elements, such as oxygen (i.e., an oxide derivative), sulfur (i.e., a sulfide derivative) or carbon and oxygen together (i.e., a carbonate derivative). To produce the metal, these compounds have to undergo a chemical reaction. Smelting therefore consists of using suitable reducing substances that will combine with those oxidizing elements to free the metal.

Current smelting furnace designs are more than often either tall vertical cylinders or rectangular boxes. Both result in either high construction costs for the tall cylindrical approach, or high operational and maintenance costs associated with the refractory material for rectangular box designs since refractory is not stable in box type designs.

Numerous types of furnaces exist on the market. In an example, U.S. Pat. No. 6,537,342 describes an apparatus for a metal reduction and melting process, in which a metal and carbon-containing burden is heated in an induction furnace including a heating vessel in which the burden can float in at least one heap on a liquid metal bath in the vessel. The apparatus is characterized in that it includes at least one induction heater or inductor located at the bottom center line of the vessel, with the longitudinal access oriented perpendicular to the access of the vessel. The furnace is generally electrically heated from the outside via induction means.

Even if U.S. Pat. No. 6,537,342 provides a cylindrical design to its furnace, it leads to an inefficient way of providing heat to the furnace because heat needs to travel towards the wall of the furnace as well as through the refractory material before heating the interior of the furnace.

In another example, U.S. Pat. No. 6,146,437 describes a metal-containing compound reduction and melting process which entails feeding a burden made of a mixture of the metal containing compound and a suitable bath of the metal in liquid form so that a reaction zone is formed in the burden in which the metal-containing compound is reduced and a melting zone is formed below the reaction zone in which the reduced metal is melted. The furnace is generally electrically heated from the outside via electrical means.

Even if U.S. Pat. No. 6,146,437 provides a cylindrical design to its furnace, it leads to an inefficient way of providing heat to the furnace since the heat needs to travel towards the wall of the furnace as well as through the refractory material before heating the interior of the furnace. Use of electrical heating is both costly and inefficient.

In another example, U.S. Pat. No. 5,411,570 describes a method of making steel by heating in a channel type induction furnace an iron containing burden and carbon. The carbon is included in the burden and/or contained in hot metal. The temperature of the liquid product so formed is maintained above its liquidus temperature by controlling the amount of heat supplied to the furnace and/or the rate at which the burden is added to the furnace.

Even if U.S. Pat. No. 5,411,570 provides a cylindrical design to its furnace, it leads to an inefficient way of providing heat to the furnace since the heat needs to travel towards the wall of the furnace as well as through the refractory material before heating the interior of the furnace.

In another example, Canadian application CA2934973 describes metallurgical processes and a generally square or rectangle metallurgical furnace capable of operating with a wide range of raw materials and fuels. Particularly, the heat is provided to the furnace by at least one burner in conjunction with at least one row of clack valves. However, the generally square design of the square or rectangle metallurgical furnace makes it difficult to scale up the processed carried out by such furnace.

In another example, Canadian application CA2970818 describes metallurgical processes and a metallurgical furnace that is capable of operating with a wide range of raw materials and fuels. Particularly, the furnace includes at least one curtain wall located in the upper vessel, which extends longitudinally down the furnace, and at least one booster loading system in the center of the upper vessel, which all together control the distribution of gas in the furnace. However, the vertical design of the metallurgical furnace makes it difficult to scale up the processed carried out by such furnace.

There is therefore a need for an improved smelting apparatus and for a process of operating the same.

SUMMARY

According to an aspect, there is provided a smelting apparatus for smelting metallic ore, the smelting apparatus comprises a cylindrical furnace having: a continuous curved wall with a longer axis along a horizontal direction, and end walls joining the continuous curved wall and thereby defining a longitudinal volume in the horizontal direction, the continuous curved wall having a lowermost area, wherein the longitudinal volume is divided in at least three longitudinal layers comprising a top layer within which gasified fuel is combusted for creating a hot gas composition at a temperature sufficient to release, from the metallic ore, at least molten metal and slag, a lowermost layer at the lowermost area for holding molten metal, and a mid-layer above the lowermost layer in which the slag accumulates.

According to an aspect, the smelting apparatus further comprises a raw material inlet within the continuous curved wall in fluid communication with the top layer for supplying the metallic ore to the furnace, and a combustion air inlet within the continuous curved wall in fluid communication with the top layer for providing air for inducing combustion in the furnace.

According to an aspect, the smelting apparatus further comprises a molten metal outlet in the lowermost area of the continuous curved wall in fluid communication with the lowermost layer for allowing molten metal to exit the furnace continuously and selectively.

According to an aspect, byproduct gases are released from the metallic ore and hot gas composition, and further wherein the continuous curved wall comprises an uppermost area which comprises a byproduct hot gas outlet fluidly connected to the furnace providing an exit from the furnace for the byproduct gases.

According to an aspect, the smelting apparatus further comprises a fuel inlet within the continuous curved wall in fluid communication with the top layer for supplying a fuel to the furnace and a hot gas inlet within the continuous curved wall in fluid communication with the top layer for supplying a hot gas to the furnace for gasifying the fuel, thereby producing the gasified fuel.

According to an aspect, the smelting apparatus further comprises a hot gas generator for providing gasified fuel and a gasified fuel inlet within the continuous curved wall in fluid communication with the top layer for supplying gasified fuel to the furnace.

According to an aspect, the furnace comprises an interior surface, the interior surface being lined with a refractory material.

According to an aspect, the smelting apparatus further comprises a cooling system operatively connected to the furnace for cooling an exterior surface of the furnace.

According to an aspect, there is provided a process for smelting metallic ore, comprising: providing magnetite and/or iron oxide produced from the metallic ore by hydrometallurgy; producing a hot reducing atmosphere by gasification; and contacting the magnetite and/or iron oxide with the hot reducing atmosphere to produce a molten metal, wherein the contacting is performed in a smelting apparatus comprising a cylindrical furnace having a continuous curved wall with a longer axis along a horizontal direction, and end walls joining the continuous curved wall and thereby defining a longitudinal volume in the horizontal direction.

According to an embodiment, the magnetite is produced by magnetic separation, density, or flotation during hydrometallurgy.

According to an embodiment, $Fe_2O_3$ is produced by solvent extraction and acid regeneration during hydrometallurgy.

According to an embodiment, the iron oxide and/or the hot reducing atmosphere comprises a source of carbon other than coke or coal.

According to an embodiment, the hot reducing atmosphere is produced by gasification of carbonaceous material.

According to an embodiment, the contacting of the magnetite and/or iron oxide with the hot reducing atmosphere further produces a byproduct gas used as a source of energy for the hydrometallurgy or for devolatization of biomass.

According to an embodiment, the source of energy is used for acid regeneration for the hydrometallurgy.

According to an embodiment, the molten metal is pig iron.

According to an embodiment, the molten metal is a ferro-manganese alloy, a ferro-nickel alloy, and/or a ferro-vanadium alloy.

According to an embodiment, the process is for smelting metallic ore containing trace elements, wherein the contacting of the magnetite and/or iron oxide with the hot reducing atmosphere further produces a slag containing the trace elements.

Features and advantages of the subject-matter hereof will become more apparent in light of the following detailed description of selected embodiments, as illustrated in the accompanying figures. As will be realized, the subject-matter disclosed and claimed is capable of modifications in various respects, all without departing from the scope of the claims. Accordingly, the drawings and the description are to be regarded as illustrative in nature, and not as restrictive and the full scope of the subject-matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In embodiments there are disclosed smelting apparatus and processes of operating the same.

Smelting Apparatus

Figure 1:
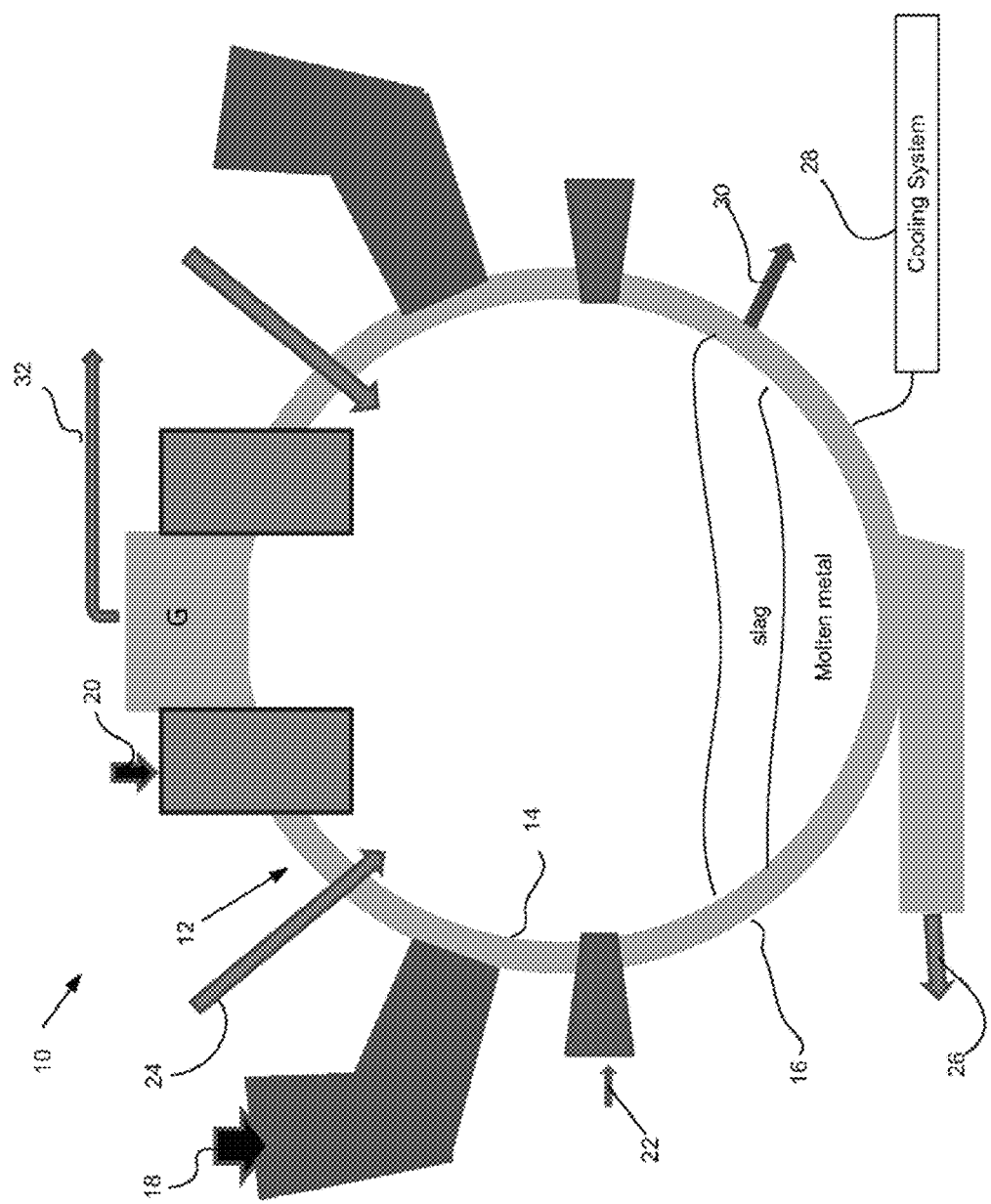
FIG. 1 is a front elevation cross-sectional view of a smelting apparatus in accordance with an embodiment.

Referring now to FIG. 1 and according to an embodiment, there is shown a smelting apparatus 10. The smelting apparatus 10 is for smelting metallic ores. The smelting apparatus 10 includes a horizontally oriented cylindrical furnace 12 which has an interior surface 14 and an exterior surface 16. The smelting apparatus 10 further includes a fuel inlet 18 which is operatively connected to the furnace 12 for providing a fuel in the furnace 12. According to an embodiment, the fuel includes, without limitation, coal, petcoke, coke, biomass carbon (i.e., either powder or briquetted), and the like.

The smelting apparatus 10 further includes a raw material inlet 20 which is operatively connected to the furnace 12 for providing a raw material in the furnace 12. According to an embodiment, the raw material includes, without limitation, any fine ore which meets the overall economic requirements and additional flux materials as required for the chemical balance of the process (process reactions described below). More specifically, the raw material may be fine iron ore which meets the overall economic requirements and additional flux materials as required for the chemical balance of the process which is involved within the furnace 12.

The smelting apparatus 10 further includes a hot gas inlet 22 which is operatively connected to the furnace 12 for providing a hot gas in the furnace 12. It is to be mentioned that while any hydrocarbon gas can be used, natural gas is an economically viable choice. The smelting apparatus 10 further includes a combustion air inlet 24 which is operatively connected to the furnace 12 for providing air inducing combustion in the furnace 12. It is to be mentioned that, while the furnace 12 is in operation, combustion from combustion air entering the furnace 12 via combustion air inlet 24, is not complete to provide oxidation in the second step of the chemical reaction.

The purpose of the oxidation is to generated a self-reducing atmosphere by producing a mix of primarily CO and some $CO_2$ which will react with the ore thereby removing oxygen from the ore, reducing the ore to the metallic form and shifting the gas composition to primarily $CO_2$. The self-reducing atmosphere may be generated with coal, coke, natural gas, biomass, hydrogen and electricity.

It is to be mentioned that the amount of heat needed for the smelting process involved within the furnace 12 is internally provided within the furnace 12.

The smelting apparatus 10 further includes a metal outlet 26 which is operatively connected to the furnace 12 for the metal to exit (i.e., continuously exit) the furnace 12. The smelting apparatus 10 may further include a slag outlet 30 which is operatively connected to the furnace 12 for slag to exit (i.e., periodically exit) the furnace 12. The slag is made from the non-metallic elements in the ore and the fluxes added with the raw material charge to assure that the slag is molten at the furnace operating temperature.

Additionally, according to an embodiment, the smelting apparatus 10 further includes a byproduct hot gas outlet 32 operatively connected to the furnace 12 for the byproduct hot gas to exit the furnace 12. After the various chemical reactions are completed within the furnace 12 and the ore is reduced to metal, the byproduct hot gas is a combination of CO, $CO_2$ and $N_2$ (in the case when natural gas is the fuel).

According to another embodiment, the interior surface 14 is refractory lined. The refractory material used for the interior surface 14 may include, without limitation, various carbon-based materials and $Al_2O_3$-based materials.

According to another embodiment, the refractory materials used will vary depending on their location within the furnace 12 as a function of process temperature and location. For example, various carbon-based materials may be used in the lower portion of the furnace 12, while $Al_2O_3$-based materials may be used in the upper portion of the furnace 12. Both preformed fired bricks and castable materials may be used as a function of location and economics.

According to another embodiment, the smelting apparatus 10 may further include a cooling system 28 which may be operatively connected to the furnace 12 for cooling the exterior surface 16 of the furnace 12. The furnace 12 may be cooled with water based on economics. Water may be recirculated through a common heat exchanger and reused as the cooling agent or fluid.

According to an embodiment, there is provided a smelting apparatus 10 for smelting metallic ore. The smelting apparatus 10 comprises a furnace 12 having a continuous curved wall 15 and end walls (not shown) defining a longitudinal volume having a longitudinal axis in a horizontal direction. The continuous curved wall 15 has a lowermost area 17. The longitudinal volume is divided in at least three longitudinal layers comprising a top layer (A) within which gasified fuel is combusted for creating a hot gas composition at a temperature sufficient to release, from the metallic ore, at least molten metal and slag, a lowermost layer (C) at the lowermost area for holding molten metal, and a mid-layer (B) above the lowermost layer in which the slag accumulates.

In operation, within the furnace 12, the fuel is gasified to create a hot fuel gas that is combusted by the combustion air creating a hot gas composition and a temperature to smelt the metallic ores. For iron ores, these chemical reactions occurring within the furnace 12 result in the following chemical formulas:

$$C+O_2=CO+CO_2 \text{(Fuel Gasification)}$$

$$CO+FeO=CO_2+Fe$$

$$C+CO_2=2\,CO$$

It is to be noted that not only FeO, but all forms of iron oxides (e.g. $Fe_3O_4$ and $Fe_2O_3$ (hematite)) may be reduced to pig iron in metallic form by the furnace 12. It is to be further noted that similar reactions may occur within the furnace 12 for other metallic elements that are in the ore (other than iron). For example, in the case of manganese (IV) Oxide ($MnO_2$), reaction occurs according to the following chemical equation:

$$MnO_2+C=MnO+CO \text{(Fuel Gasification)}$$

$$MnO_2+CO=MnO+CO_2$$

$$MnO+C=Mn+CO$$

These reactions generally occur below 900° C., and the final reduction of MnO only takes place with solid carbon. The reaction is highly endothermic. In the case of Nickel (II) Oxide (NiO), the reaction occurs according to the following chemical equation:

$$NiO+C=Ni+CO \text{(Fuel Gasification)}$$

Advantageously, the smelting apparatus 10 as described above utilizes a horizontally oriented cylindrical furnace 12 defining a horizontal axis which combines the low height approach of the box concept with the inherent refractory stability of the cylindrical approach.

According to another embodiment, the smelting apparatus 10 may be used to process mine and steel mill waste products.

According to a further embodiment, the smelting apparatus 10 may be used with a broad range of carbon sources. As mentioned above, carbon sources may include, without limitation, coal, charcoal, coke, petcoke, and biomass (i.e., sawdust), and the like.

According to yet another embodiment, the smelting apparatus 10 may be used for other metals, such as, without limitation, silver, copper and other base metals from their ores.

The smelting apparatus 10 has a horizontally oriented cylindrical furnace 12. The system capacity operating the smelting apparatus 10 may be expanded readily by making the furnace 12 longer. Both diameter and length may be variable. As such, doubling the length would double the production rate and doubling the diameter would quadruple the production rate.

According to an embodiment, the interior diameter of the furnace 12 may vary from about 3 meters to about 6 meters and the length of the furnace 12 may vary from about 6 meters to about 30 meters, as a function of a desired production capacity. For example, the capacity of the smelting apparatus may be about 1,500 tons or more of molten metal per day.

The smelting apparatus 10 may further include, without limitation, hot air delivery options, tuyeres (i.e., ceramic tuyeres, cast metal water cooled tuyeres and/or uncooled ceramic tuyeres.), continuous casting, raw material charging options and the like (not shown).

According to another embodiment, the furnace 12 may be filled utilizing a static multi-point raw material charging system to provide the raw material to the raw material inlet 20 and into the furnace 12.

According to an embodiment, the smelting apparatus 10 may be provided in various size or may be designed to be scalable in order to accept various loads of starting material. For example, the furnace 12 of the smelting apparatus 10 may be scalable by adjusting the length thereof in order to suit specific production requirements. For example, the furnace 12 may be configured for smelting iron ore which market capacities are at least of 500,000 tons per year, ferro alloys which market capacities are typically 50,000 tons per year, or ferrovanadium which market capacities are typically 10,000 tons per year.

Advantageously, the furnace 12 has a low height design which eliminates the requirement for a highly reactive fuel, such as, without limitation, metallurgical coke. The low height design of furnace 12 also eliminates the requirement for important structural support under the furnace 12.

The furnace 12 may have a refractory lining extending from the interior surface 14 which is inherently stable under operating conditions. This configuration allows long furnace life and stable operating conditions.

Operation of the Smelting Apparatus

In embodiments there are disclosed operation of the smelting apparatus in various processes for smelting ore.

Still referring to FIG. 1, during operation of the smelting apparatus 10, the fuel is charged to the furnace 12 via the fuel inlet 18. The fuel may be lump carbonaceous fuel or any other suitable fuel. The fuel may be continuously charged to the furnace 12. Alternatively, the fuel may also be fed in batch to the furnace 12. The fuel inlet 18 may be located on the side of the furnace 12, or at any location at the periphery of the furnace 12 such as to fluidly connect the fuel inlet 18 and the furnace 12.

The raw material is charged to the furnace 12 via the raw material inlet 20. The raw material may be continuously charged to the furnace 12 or charged in a batch operation to the furnace 12. The raw material may be fed on the top of the furnace 12 via the raw material inlet 20.

The hot gas may be injected to the furnace 12 via the hot gas inlet 22. The hot gas may be, without limitation, hot blast air. The hot gas may be injected via the hot gas inlet 22 below the carboneous fuel inlet 18, or at any location at the periphery of the furnace 12.

Combustion air is injected to the furnace 12 via the combustion air inlet 24. The combustion air may be post combustion air and may be injected to the furnace 12, without limitation, at the base of the raw material inlet 20.

The carbonaceous fuel is then gasified in an oxygen lean environment to create a hot fuel gas that is combusted by the post combustion air creating the necessary hot gas composition and temperature to smelt the ore feed.

The smelted ore descends to the base of the furnace 12 where the metal will separate from the non-metallic components (i.e., slag). The metal is cast (or continuously cast) from the metal outlet(s) 26 of the furnace 12. It is to be noted that the metal outlet 26 may be located at the bottom portion of the furnace 12. Only a few inches of molten metal need to be left in the bottom portion of the furnace 12 to prevent gas communication from the bottom portion such as to prevent oxygen to enter the furnace 12.

The slag may be cast (or periodically cast) from the furnace 12 via the slag outlet(s) 30 by opening a recess on the side of the furnace 12 to allow the slag to exit the furnace 12 or by periodically drilling a hole in the wall of the furnace 12 at the height of the slag (at the mid-layer) to enable the slag to exit the furnace 12. The furnace byproduct gas ($N_2$, $CO$ and $CO_2$) leaves the furnace 12 via the byproduct hot gas outlet(s) 32 to be transferred to environmental treatment and subsequent energy recovery. It is to be mentioned that the byproduct hot gas may be, without limitation, reused within the hot gas (or hot blast), sold as a fuel, used/sold to heat a boiler to produce electricity, and the like (depending on the geographical location).

In an embodiment, the smelting apparatus 10 is operated continuously under a positive pressure and a reducing atmosphere.

In an embodiment, there is no combustion inside the furnace 12 of the smelting apparatus 10 so that under normal operation the gases in the furnace 12 are reducing and any leakage will be from inside the furnace to the atmosphere.

Figure 2:
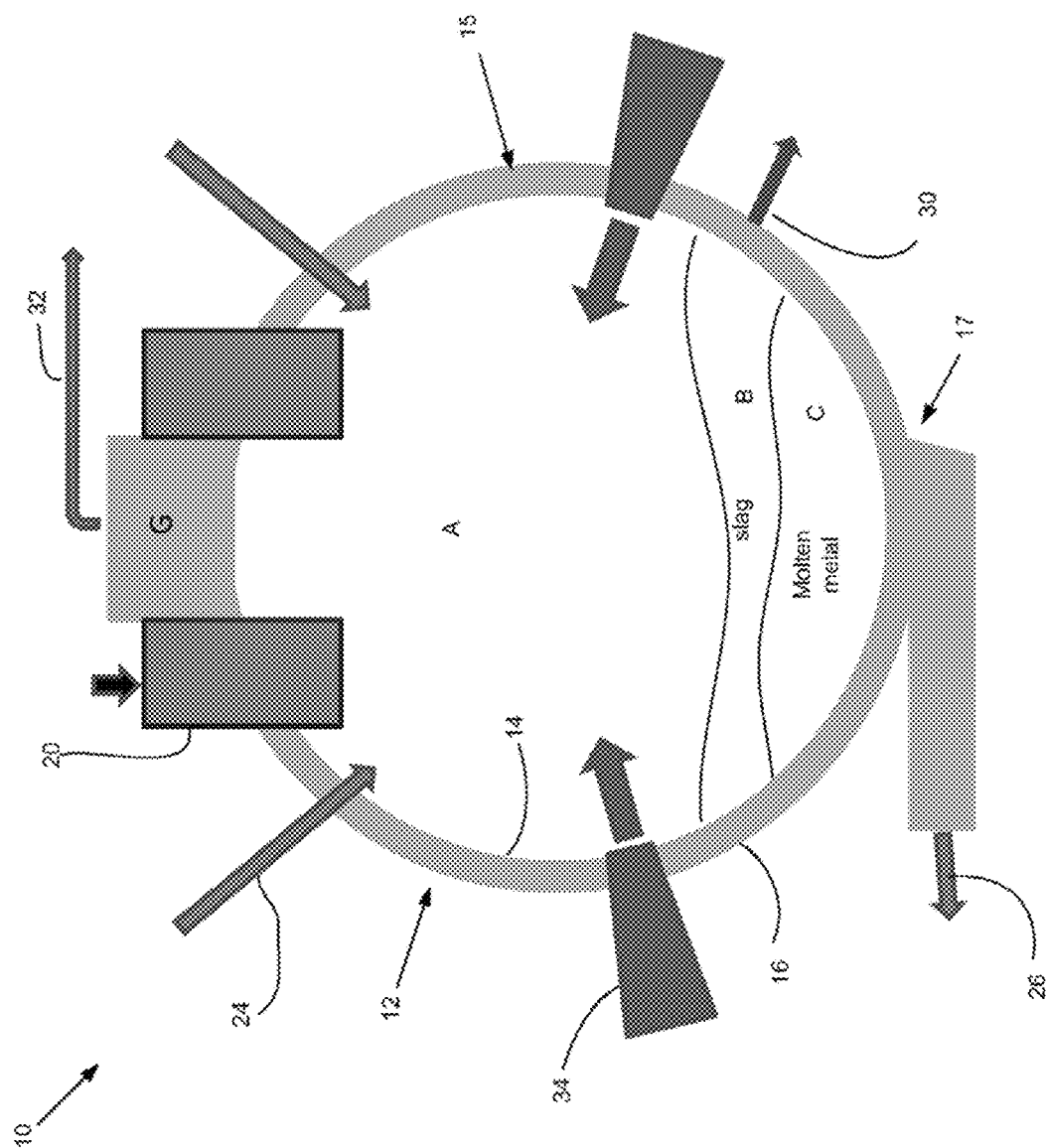
FIG. 2 is a front elevation cross-sectional view of a smelting apparatus in accordance with another embodiment.

Referring now to FIG. 2 and according to another embodiment, the furnace 12 may include gas burner(s) or hot gas generator(s) which is connected to a gasified fuel inlet 34 that will replace the use of the carbonaceous fuel inlet 18 and the hot gas inlet 22 (i.e., the use of solid fuel and hot air blast). The hot products of combustion may provide the necessary thermal energy to assure molten products, metal and slag, at the outlets 26, 30 of the furnace 12. The primary charge material, self-reducing briquettes may be adjusted in their overall chemistry to offset any changes in the overall furnace chemical balance.

According to another embodiment, it is to be noted that all inlets and outlets 18, 20, 22, 24, 26, 30, 32 of the furnace 12 may include a plurality of inlets/outlets as a function of the overall length and/or diameter of the furnace 12.

One of the advantages of the smelting apparatus 10 as described above is the horizontal orientation of the cylindrical design, which utilizes the pressure containment advantages of the cylindrical approach (vertically oriented cylindrical approach) without the cost disadvantages of high construction, while avoiding the refractory instability associated with the rectangular approach (horizontally oriented rectangular approach). According to the configuration of the smelting apparatus 10 as described above, no induction/electrical heating (i.e., which is costly and less efficient) is employed for providing heat to the interior of the furnace 12, all the heat required for the process is generated from the carbon (i.e., lump carbonaceous fuel) charged to the furnace 12. Furthermore, the furnace 12 is fixed; i.e., it does not rotate.

According to the configuration of the smelting apparatus 10, another advantage is that there is no accumulation of the molten metal in the furnace 12 and the process is not dependent on this accumulation. All metal produced is continuously cast from the furnace 12.

Ore Smelting Processes Using the Smelting Apparatus

In embodiments there are disclosed uses of the smelting apparatus 10 in various processes for smelting iron ore and/or various ferro alloys. There are also disclosed embodiments for recovery of non-ferrous metal and critical or trace elements, such as valuable or precious metals, from primary and secondary slags formed during the processes for smelting iron ore and various ferro alloys.

Figure 3:
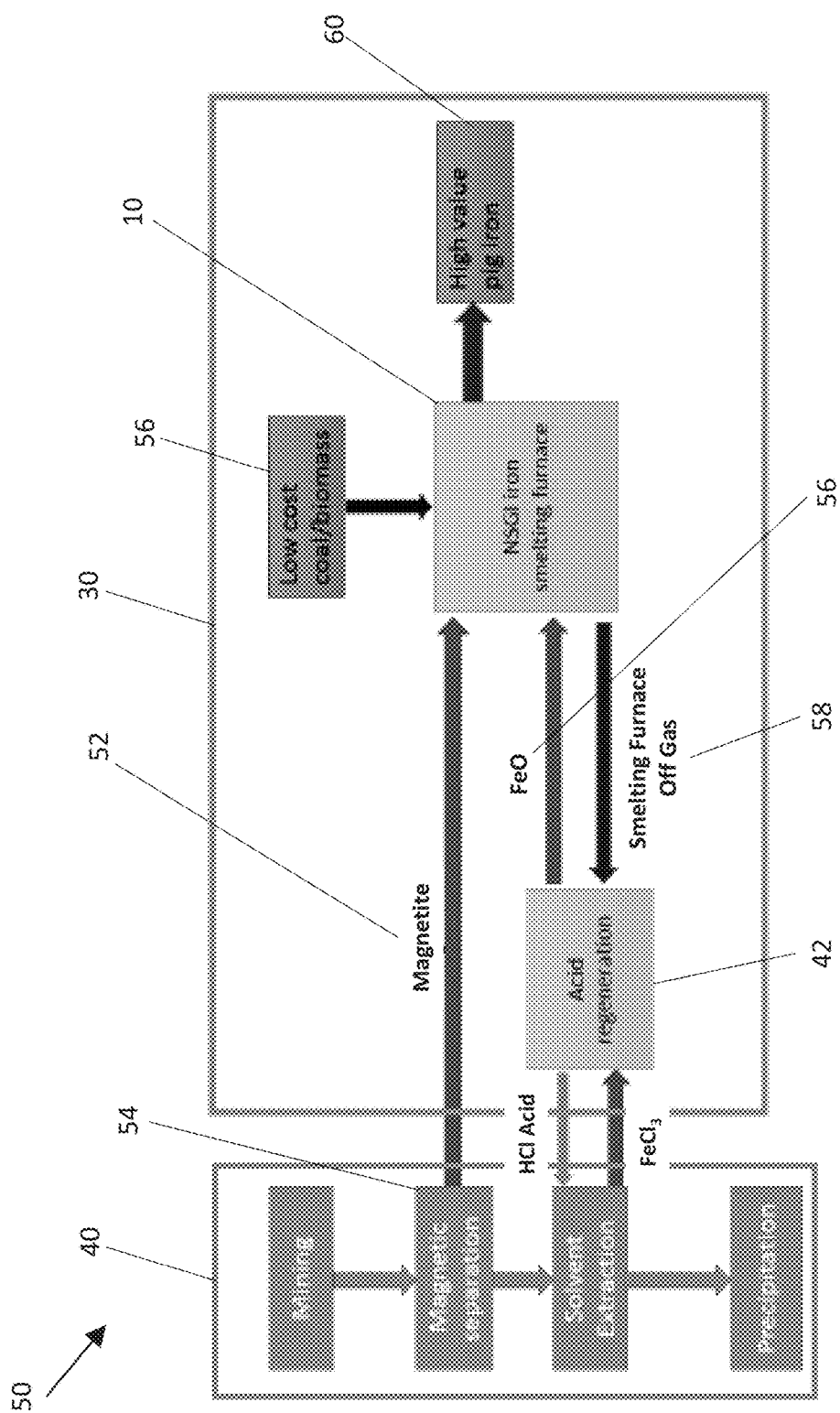
FIGS. 3 and 4 are a box diagrams representing a process combining a pyrometallurgical process and a hydrometallurgical process.
Figure 4:
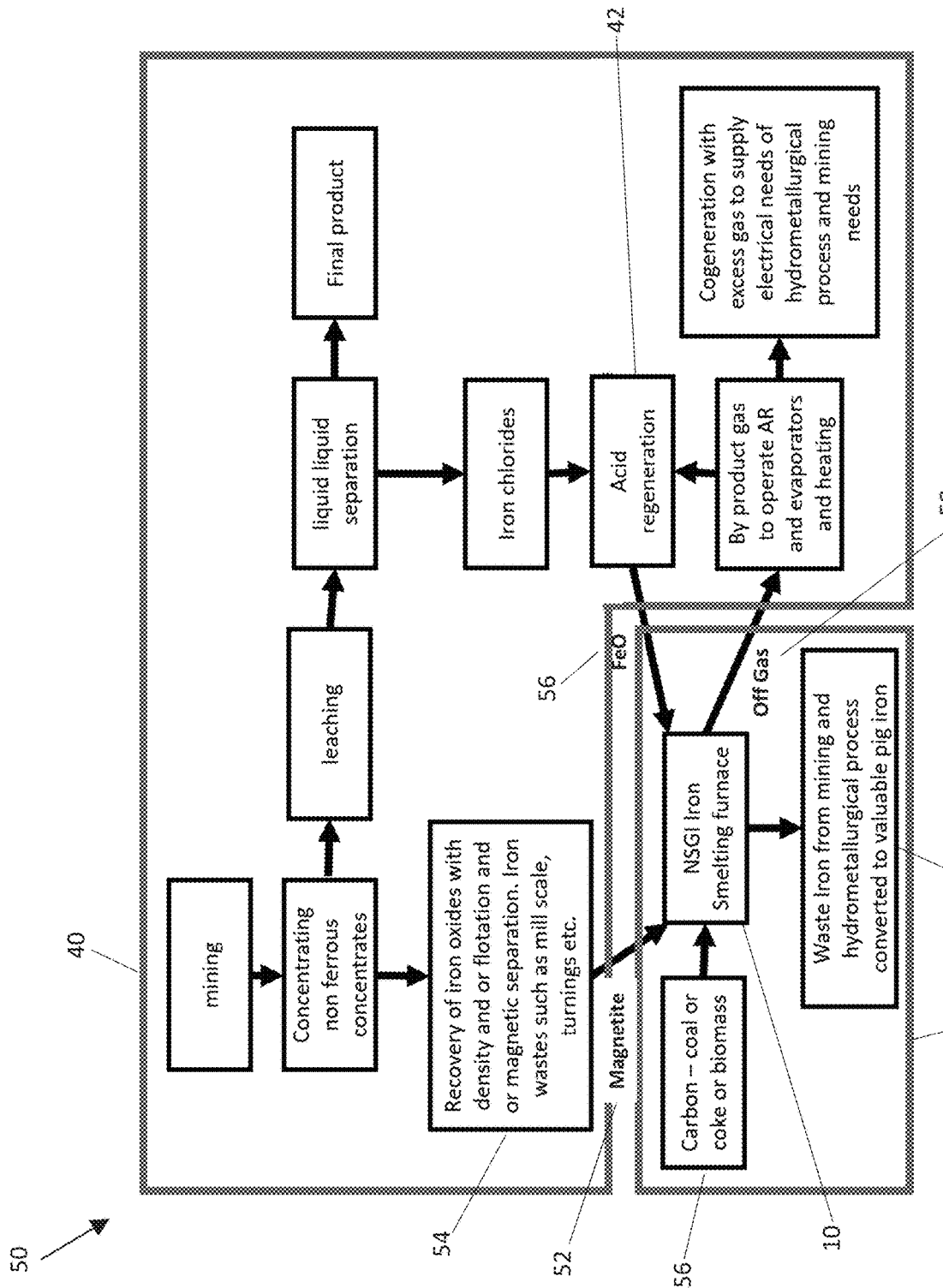

Referring now to FIG. 3 and according to an embodiment, there is shown the smelting apparatus 10 which is used in a pyrometallurgical process 30 (e.g. ore smelting) in combination with a hydrometallurgical process 40 (e.g. ore leaching) for producing high-value pig iron 60 and/or extracting valuable or precious metals in a cost-effective manner. As shown in FIG. 3, the combined pyrometallurgical/hydrometallurgical process 50 uses as starting material magnetite 52 isolated by a magnetic separation step 54 from the ore and Iron (II) Oxide (FeO) 56 (or any other form of iron oxide, e.g. $Fe_3O_4$ and $Fe_2O_3$ (hematite)) obtained from an acid regeneration step 42 of the hydrometallurgical process 40. Alternatively, the magnetite 52 may be isolated by any other means known in the art, such as by flotation, density, and the like. Still alternatively, any other suitable starting material, such as waste materials containing iron and/or valuable or precious metal(s), may be used and may be produced and provided to the smelting apparatus 10 by any means known in the art.

In an embodiment, the starting material of feed for the smelting apparatus 10 used in the combined process 50 is has over about 50% Fe content and may be in any form of iron oxide (e.g. FeO, $Fe_3O_4$, $Fe_2O_3$ ($Fe_2O_3$)).

For powering the smelting apparatus 10, coal, biomass, plastic wastes, and/or any other source of low-cost material 56 is used as energy source to operate the combined process 50. Indeed, the smelting apparatus 10 may be operate with a wide range of carbonaceous material as both the energy source and chemical reductant, such as bearing wastes and waste plastics materials. The treatment of such waste materials may generally be energy intensive to treat, and this energy requirement may be effectively satisfied by the off gas 58, which is a byproduct gas.

As part of the cost-effective manner of operating the smelting apparatus 10 in the combined process 50, the off gas 58 produced by the smelting apparatus 10 during the pyrometallurgical process 30 is collected and used as an energy source to operate the acid regeneration step 42 of the hydrometallurgical process 40. This provides for a low-cost acid regeneration alternative to the hydrometallurgical acidic solutions. For example, for every ton of pig iron produced an equivalent excess gas of 10 GJ may be produced, which may be used for the hydrometallurgical process. In the case of ferro alloys, between about 10 and about 15 GJ may be produced. Alternatively, the energy source derived from the off gas 58 may be used for any other step(s) of the hydrometallurgical process, such as a calcining step, a heating step, an evaporation step, and the like.

Furthermore, the combined process 50 provides a self-contained solution for the non-ferrous metal industries that converts iron bearing wastes into a high value saleable product and, thus, eliminates the need for iron bearing wastes to be landfilled. According to the present invention, all forms of iron bearing wastes recovered may be converted to pig iron from any form. Indeed, the extraction of non-ferrous metals in the mining industry often generates significant quantities of iron waste material that currently is returned to the environment either as a solid waste landfilled back to the area of the excavation. Also, the recovery of iron in chloride solutions through acid regeneration is generally very costly and energy intensive and often there is not user for the hematite units produced. Generally, the cost of addressing the iron material to comply with environmental regulations is sufficiently high to make the commercialization of non-ferrous mines or chemical processing centers high and uneconomical. There is a market for iron chlorides for the water treatment industry but this is easy to saturate and very region-oriented. By converting the iron to pig iron tailings are reduced and the energy/gas by product can be used for the hydrometallurgical process and to supply gas for the acid regeneration unit unlocking the value of the non-ferrous mine. The pig iron has a high value and helps address the energy challenges of these industries while reducing environmental impacts by converting more of the waste streams into usable products.

As for the recovery of iron in chloride solutions through acid regeneration is generally very costly and energy intensive and often there is not user for the hematite units produced. Generally, the cost of addressing the iron material to comply with environmental regulations is sufficiently high to make the commercialization of non-ferrous mines or chemical processing centers high and uneconomical. There is a market for iron chlorides for the water treatment industry but this is easy to saturate and very region oriented. By converting the iron to pig iron tailings are reduced and the energy/gas by product can be used for the hydrometallurgical process and to supply gas for the acid regeneration unit unlocking the value of the non ferrous mine. The pig iron has a high value and helps address the energy challenges of these industries while reducing environmental impacts by converting more of the waste streams into usable products.

In an embodiment, the product streams resulting from the smelting apparatus 10 includes (i) metallic pig iron, metallic ferro alloys (FeMn and/or FeNi), and materials of high-value in steelmaking; and (ii) at least one smelting process slag that is chemically controlled to be produced as a liquid wherein the proportions of the desired trace elements or valuable or precious metal(s) are increased by a factor of between about 4 and about 5 times.

In an embodiment, the combined process 50 and the smelting apparatus 10 is used to process ore containing non-ferrous metal(s), such as manganese (Mn), nickel (Ni), vanadium (V), some rare earth metal(s), and alloys thereof. Those non-ferrous metals and alloys thereof are not reduced during smelting to remain as metallic oxides and are principally found in and recovered from a primary slag (which also contains MgO, CaO and titanium dioxide ($TiO_2$), for example) formed during smelting. Some critical or strategic elements, such as vanadium and scandium (Sc), may also be found in the primary slag, but may also be found in a secondary slag (see hereinbelow). These critical or strategic elements are recovered from the primary and secondary slags by hydrometallurgy processes. The non-ferrous elements are extracted from the primary slag by leaching or selective leaching cycles and by liquid-liquid separation (e.g. using a resin or by solvent extraction).

In an embodiment, critical or trace elements, such as vanadium, scandium, and some rare earth metal(s), are concentrated up to 20 times in a secondary slag. In the case of vanadium, for example, it is generally found at about 50% in the primary slag and at about 50% in pig iron. Scandium and other precious metals are found in the primary slag and pig iron in amount similar to the amount of vanadium. Various critical elements are also generally found in the primary slag and in pig iron to be collected in the secondary slag or in percentages. By changing the slag pH and creating a secondary slag, vanadium, scandium and some rare earths metal(s) are concentrated with better ratios of iron and salt metals, such as Mg and Ca, in the secondary slag, thereby improving the operating costs of recovering vanadium, scandium and some rare earths metal(s). Metalized critical elements in the molten pig iron may be recovered in the secondary slag. This helps to reduce the volume by $\frac{1}{10}^{th}$ to $\frac{1}{60}^{th}$ of the initial starting volume. In addition, the iron making process reduces tailings and provides energy for the hydrometallurgical process and improves IRR by converting iron rich tailings into salable products.

In an embodiment, a secondary gangue stream is formed during operation of the smelting apparatus 10. The secondary gangue stream is cooled to a solid, and crushed. The crushed gangue stream is treated with concentrated nitric acid, which primarily and selectively dissolve the CaO and MgO portions of the gangue, leaving $SiO_2$ and $Al_2O_3$ as the principal remaining compounds. Then, leaching with HCl or Sulphuric acid achieves targeting the metals focused of recovery and purification by liquid-liquid separation (e.g. using a resin or by solvent extraction). The valuable or precious metal(s) are concentrated in the remaining solids by a factor of two as compared to the ore. The resulting liquid stream of metallic nitrates may be use as a feedstock for further processing as fertilizer. The remaining solid stream, which may contain $SiO_2$, $Al_2O_3$, and other valuable or precious metals, is then dissolved in hydrochloric acid. The resulting liquid being treated by a series of organic liquids to preferentially remove individual elements based on concentration and monetary value. In order to recycle the acid used for leaching and reduce costs, the acid used is regenerated using the off gas of the smelting apparatus 10 as the energy source.

The treatment of the secondary gangue stream requires energy for evaporation or heating or acid regeneration, for example. HCl is the only one that allows for acid regeneration. More acid regeneration is enabled by providing energy to do this and creating complete recovery of HCl and iron units. Acid regeneration also works with $MgCl_2$. For example, the highest throughput for iron rich solution is when the iron is in $Fe^{3+}$ form $FeCl_3$ as $Fe^{3+}$ produces 185 to 210 gpl, while $Fe^{2+}$ produces 140 gpl maximum.

In an embodiment, the smelting apparatus 10 produces (i) pig with an iron content of 94% or higher; (ii) manganese in the form of ferro manganese in varying ratios of manganese to iron with a total metallic content of 94% or higher; (iii) nickel in the form of ferro nickel in varying ratios of nickel to iron with a total metallic content of 94% or higher; and (iv) vanadium in the form of ferro vanadium in varying ratios depending on the ratio of $V_2O_5$ with a total metallic content of 94% (iron is added).

In an embodiment, the combined process 50 and the smelting apparatus 10 is used with self-reducing pellets or briquettes known in the art as a method of accelerating the smelting reactions of iron ore. In this case, the scalability of the smelting apparatus 10 and the use of self-reducing briquettes allows the economic smelting of ferruginous ores and wastes contaminated by other metals. Particularly, the functionality of the self-reduction pellets or briquettes approach rely on intimately mixing and agglomerating all the finely ground materials required for smelting, such as ore, appropriate wastes, fuel, and fluxes, with a functional binder. The agglomeration of these materials produces a self-contained system that, when exposed to the required thermal input and atmosphere of smelting, reduces to a metal and molten slag(s).

In an embodiment, the self-reducing briquette may also use biomass that is devolatized.

In an embodiment, the smelting apparatus 10 advantageously replace a conventional blast furnace, eliminate the need for coking coal, and use low to medium volatile thermal coal during operation of the combined process 50.

In an embodiment, the smelting apparatus 10 is more efficient than a conventional blast furnace (which are generally bigger in size), such that operating the smelting apparatus 10 during about 20 minutes provides the same smelting results as operating a conventional blast furnace for about 8 hours.

In an embodiment, the smelting apparatus 10 may advantageously replace costly electric furnaces that are normally operated as twin shells and generally cost more than 4 times the capex.

Advantageously, due to its horizontal and cylindrical design, the smelting apparatus 10 of the present invention may be used to produce ferro alloys, such as ferro-manganese, ferro-nickel, and ferro-vanadium, at a substantially lower cost as compared to using a blast furnace.

Another advantage of the smelting apparatus of the present invention is that it may smelt ore that would otherwise require to be sintered or pelletized to be amenable to smelting. This in turn allows for a reduction of between about 20% to about 30% of $CO_2$ that is usually required by the smelting process and, thus, reduces operation cost. By eliminating the agglomeration process of pellets 20% less $CO_2$ is emitted. By eliminating the sintering process 30% less $CO_2$ is emitted compared to the conventional iron making with a blast furnace. In addition, due to faster reaction time with the combined self-reducing briquette and hot blast for melting, the smelting apparatus 10, may use coke, metallurgical coal, and/or less desirable coals (e.g. low volatile and medium volatile coals), for the self-reducing briquettes, and any type of thermal coal for the energy portion. Alternatively, natural gas, hydrogen and electricity can all be used as energy sources with the smelting apparatus 10.

Advantageously, the smelting apparatus 10 of the present invention may be operated without requiring coke and/or coke as it generally the case for smelting.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A smelting apparatus for smelting metallic ore, the smelting apparatus comprising a cylindrical furnace having:
   a continuous curved wall with a longer axis along a horizontal direction, and
   end walls joining the continuous curved wall and thereby defining a longitudinal volume in the horizontal direction, the continuous curved wall having an uppermost area and a lowermost area, wherein the longitudinal volume is adapted to contain metallic ore and briquette wherein the metallic ore is adapted to be converted into at least molten metal and slag;
   a raw material inlet within the continuous curved wall adapted to supply metallic ore to the furnace;
   at least two hot gas inlets on the cylindrical furnace to blow heated gas through the longitudinal volume to be available for chemical reactions to take place;
   a molten metal outlet in the lowermost area of the continuous curved wall adapted to allow molten metal to exit the furnace continuously and selectively;
   a slag outlet above the lowermost area adapted to allow the slag to exit the furnace continuously and selectively;

a byproduct hot gas outlet in the uppermost area of the continuous curved wall adapted to allow byproduct gases to exit the furnace;
a combustion air inlet for supplying air within the furnace, the combustion air inlet being located within the continuous curved wall and proximate an outlet of the raw material inlet, the combustion air inlet being oriented towards a path of the metallic ore entering the furnace through the raw material inlet so as to inject combustion air across the path; and
a fuel inlet for supplying fuel within the furnace, the fuel inlet being located within the continuous curved wall, the fuel inlet being oriented towards the path of the metallic ore entering the furnace through the raw material inlet so as to inject fuel across the path
wherein the combustion air inlet and the fuel inlet are located within an upper portion of the furnace so that the combustion of air and fuel occurs above a level of molten metal and slag when the furnace is in use.

2. The smelting apparatus of claim 1, further comprising a hot gas generator for providing gasified fuel and a gasified fuel inlet within the continuous curved wall for supplying gasified fuel to the furnace.

3. The smelting apparatus of claim 1, wherein the furnace comprises an interior surface, the interior surface being lined with a refractory material.

4. The smelting apparatus of claim 1, further comprising a cooling system operatively connected to the furnace for cooling an exterior surface of the furnace.

* * * * *